United States Patent
Kotchick et al.

(10) Patent No.: US 6,642,977 B2
(45) Date of Patent: Nov. 4, 2003

(54) LIQUID CRYSTAL DISPLAYS WITH REPOSITIONABLE FRONT POLARIZERS

(75) Inventors: Keith M. Kotchick, St. Paul, MN (US); Hassan Sahouani, Hastings, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/885,172

(22) Filed: Jun. 20, 2001

(65) Prior Publication Data

US 2003/0016317 A1 Jan. 23, 2003

(51) Int. Cl.$^7$ .............................................. G02F 1/1335
(52) U.S. Cl. .......................................... 349/96; 359/485
(58) Field of Search ........................... 349/96; 359/485, 359/501, 490, 493

(56) References Cited

U.S. PATENT DOCUMENTS

| | | | |
|---|---|---|---|
| 3,874,163 A | * 4/1975 | Ikeno | 58/50 |
| 4,413,915 A | * 11/1983 | Besson | 368/71 |
| 4,466,704 A | 8/1984 | Schuler et al. | |
| 4,770,500 A | 9/1988 | Kalmanash et al. | |
| 4,837,817 A | 6/1989 | Maemori | |
| 5,235,449 A | 8/1993 | Imazeki et al. | |
| 5,341,231 A | * 8/1994 | Yamamoto et al. | 349/63 |
| 5,488,496 A | 1/1996 | Pine | |
| 5,666,223 A | 9/1997 | Bennett et al. | |
| 5,672,296 A | 9/1997 | Shen et al. | |
| 5,751,389 A | 5/1998 | Andreatta et al. | |
| 5,751,483 A | 5/1998 | Itoh et al. | |
| 5,768,370 A | 6/1998 | Maatta et al. | |
| 5,861,931 A | 1/1999 | Gillian et al. | |
| 5,891,297 A | 4/1999 | Stadtmueller | |
| 6,115,091 A | * 9/2000 | Kondoh et al. | 349/72 |
| 6,147,937 A | 11/2000 | Arikawa et al. | |
| 6,227,276 B1 | 5/2001 | Kim et al. | |
| 6,245,399 B1 | 6/2001 | Sahouani et al. | |

FOREIGN PATENT DOCUMENTS

| | | |
|---|---|---|
| EP | 182 632 A2 | 5/1986 |
| EP | 397 263 B1 | 11/1990 |
| EP | 397 263 A1 | 11/1990 |
| EP | 927 907 A1 | 7/1999 |
| EP | 0 927 907 A1 | 7/1999 |
| EP | 996 025 A1 | 4/2000 |
| GB | 2 307 562 | 5/1997 |
| JP | 62-69202 | 3/1962 |
| JP | 54116898 | 9/1979 |
| JP | 02116826 | 5/1990 |
| JP | 02264218 | 10/1990 |
| JP | 03061993 | 3/1991 |
| JP | 06160834 | 6/1994 |
| JP | 9043599 A | 2/1997 |
| JP | 10010521 | 1/1998 |
| JP | 2000098369 | 4/2000 |
| WO | WO 96/16015 | 5/1996 |
| WO | WO 96/37806 | 11/1996 |
| WO | WO 98/52077 | 11/1998 |
| WO | WO 00/03380 | 1/2000 |
| WO | WO 00/22463 | 4/2000 |
| WO | WO 00/41030 | 7/2000 |
| WO | WO 01/31371 A1 | 5/2001 |

\* cited by examiner

*Primary Examiner*—Toan Ton
*Assistant Examiner*—P. R. Akkapeddi
(74) *Attorney, Agent, or Firm*—Robert J. Pechman

(57) ABSTRACT

The present invention includes electronic devices having liquid crystal display modules and repositionable front polarizers. A viewer views the display module through a front polarizer, which can be repositioned to change the display appearance, enhance the display contrast, invert the image, increase ambient light exposure, provide privacy, or the like. Repositionable front polarizers can be tiltably and/or rotatably mounted in front of the display module, or can be remotely located, for example on a pair of polarizing eye glasses. The present invention also includes reflective liquid crystal displays that have internal front light guides disposed between a liquid crystal cell and a front polarizer. As such, the light from the front light guide can illuminate the liquid crystal cell without being attenuated by the front polarizer, resulting in a brighter front lit display.

3 Claims, 11 Drawing Sheets

LIQUID CRYSTAL DISPLAYS WITH REPOSITIONABLE FRONT POLARIZERS

This application is related to U.S. patent application Ser. Nos. 09/885,030; 09/885,898; and 09/885,032.

The present invention relates generally to releasably attachable or repositionable components capable of altering the appearance of liquid crystal displays in electronic devices, and more specifically to repositionable, releasably attachable, or interchangeable front polarizers and to exchangeable liquid crystal display modules.

BACKGROUND

Electronic devices that include electronic displays for conveying information to a viewer have become nearly ubiquitous. Mobile phones, handheld computers, electronic games, car stereos and indicators, public displays, automated teller machines, in-store kiosks, home appliances, computer monitors, etc., are all examples of devices that include information displays that people come into contact with on a daily basis. Many of these displays are liquid crystal displays, and many of the liquid crystal displays are monochromatic.

Liquid crystal displays function by taking light meant to illuminate the display, polarizing that light, selectively altering the polarization state of the light using liquid crystal materials, and then analyzing the light with a front polarizer. Light that is transmitted to the front polarizer with a polarization state that is aligned with the transmission axis of the front polarizer is passed by the polarizer, thereby generating a bright spot. Light that is transmitted to the front polarizer with a polarization state that is not aligned with the transmission axis of the front polarizer is at least partially blocked, and may be fully blocked, by the front polarizer, thereby generating a darker spot, or a black spot. Each spot is generally referred to as a pixel. Taken together, the pixels form an image that can display information to a viewer.

SUMMARY OF THE INVENTION

The present invention adds a whole new dimension to stylizing and customizing the appearance and/or functionality of liquid crystal displays (LCDs) for electronic devices. In the present invention, one or more polarizers can be used to add or alter displayed background and/or character colors, provide for image inversion, and produce a number of other visual or optical effects that give liquid crystal displays different appearance characteristics. According to the present invention, polarizers, or articles that include a polarizer, can be interchanged and/or repositioned relative to the liquid crystal display module to readily achieve different display appearances for the same electronic device. Interchangeable polarizers of the present invention can be front polarizers and/or rear polarizers. Also according to the present invention, electronic devices can have interchangeable display modules to allow for different display appearances and/or functionalities.

An implication of providing a releasably attachable or repositionable front polarizer for the LCD of an electronic device is that the LCD module provided with the device is preferably provided without the front polarizer that is normally adhered to its front surface. As such, a front polarizer is to be separately disposed between the display and the viewer in order for the display to be viewable. The present invention provides such a front polarizer as a releasably attachable or repositionable item. Because the present invention contemplates de-coupling the front polarizer from the LCD module, there is an opportunity to alter the display appearance by exchanging or repositioning front polarizer elements. By using differently colored polarizers, differently oriented polarizers, patterned polarizers, tiltable or rotatable polarizers, and the like, the display appearance can be readily altered according to preference, performance, fad, or whim. Along with color changes and image reversal, functional characteristics such as display contrast, brightness, and privacy viewing can also be desirably altered or added.

Releasably attachable front polarizers can create a new market for display polarizers and LCD customization. By selling front polarizers as items separate from the displays for which they are intended to be used, and by marketing front polarizers as exchangeably attachable articles that can alter display appearance, end user preference and demand can directly drive and impact available display styles and performance characteristics. In contrast, giving consumers the ability to choose display styles without de-coupling front polarizers from displays would entail making and keeping an inventory of a large number of different display modules, in some cases before market information is gathered as to which styles are more popular. This would be an expensive proposition, and one that electronic device makers are probably not inclined to pursue. The present invention creates a unique opportunity to offer display stylization options because a large variety of different front polarizers can be made relatively quickly and easily, and can be inventoried much more cheaply than display modules or whole electronic devices.

The present invention also provides the ability to interchange display modules in an electronic device. Display modules can be removed and interchanged for display appearance customization, and can also be removed and interchanged for display function customization and display upgrading as new display technologies emerge. This can all be accomplished while keeping the core electronics, power source, and housing that make up the electronic device.

In one aspect, the present invention provides an electronic device that includes a liquid crystal display module for selectively altering a polarization of light for displaying information, and a front polarizer repositionably attached to the electronic device so that there are two or more front polarizer positions in which the display module is viewable through the front polarizer.

In another aspect, the present invention provides a front lit liquid crystal display that includes a liquid crystal display module for selectively altering a polarization of light, a front polarizer positioned between the liquid crystal display module and a viewer position, and a front light positioned between the front polarizer and the liquid crystal display module, the front light capable of illuminating the liquid crystal display module so that light emitted by the front light enters the liquid crystal display module, is polarized, and returns back through the liquid crystal display module for selective polarization alteration.

In still another aspect, the present invention provides a kit that includes a handheld electronic device comprising a liquid crystal display module capable of being operated in reflective mode, with the proviso that the liquid crystal display module does not include a front polarizer so that images displayed by the display module are not readily discerned by the naked eye, and an article adapted for wearing by a viewer so that the article can be positioned between the viewers eyes and the liquid crystal display module, the article comprising a polarizer oriented so that its transmission axis allows viewing of the display module through the polarizer.

BRIEF DESCRIPTION OF THE DRAWINGS

The invention may be more completely understood in consideration of the following detailed description of various embodiments of the invention in connection with the accompanying drawings, in which.

Figure 1:
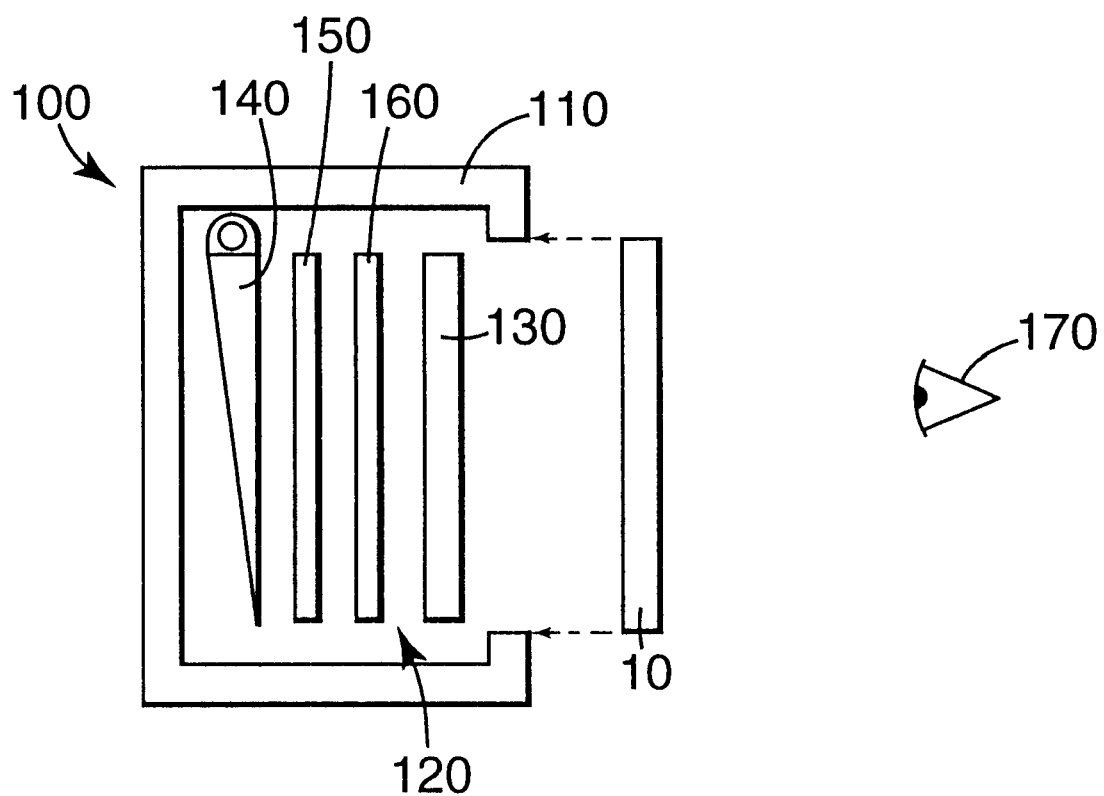
FIG. 1 is a schematic representation of an electronic device and attachable front polarizer.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention relates to the use of polarizers (including neutral density polarizers, single color polarizers, dual color polarizers, and the like) as removable, releasably attachable, interchangeable and/or repositionable front polarizers for liquid crystal display modules. For example, a polarizer can be included as part of an article such as a lens, window, transparent film, face plate, cover, or other such item that can be releasably attached to an electronic device in a position such that a user can view the LCD module of the electronic device through the polarizer. The polarizer itself may also be configured so that it can be attached (e.g., permanently bonded, removably adhered, etc.) to a window member, lens, film, or other item that is, or can be, permanently or removably attached to the electronic device. In embodiments where the front polarizer is repositionable, the polarizer can be tilted and/or rotated relative to the display module. As such, the polarizer can be tiltably and/or rotatably attached to the electronic device in a releasable or a permanent manner.

While aspects of the present invention related to interchanging and/or repositioning polarizers are primarily discussed in this document with regard to front polarizers, it will be recognized that the same or similar effects (e.g., color combination customization, image reversal, brightness and contrast enhancement, and the like) can be achieved by interchanging and/or repositioning rear polarizers. In some applications, exchanging or repositioning front polarizers may be a more suitable way to customize display appearance due to ease of user accessibility to the front polarizer position (or other reasons). In other applications, exchanging or repositioning rear polarizers may be a more suitable way to customize display appearance due to device design considerations (or other reasons).

The present invention also relates to liquid crystal display module that is configured to be removed from and plugged into an electronic device, for example for interchanging display modules that have different display characteristics or that have different or enhanced functionalities, while keeping the remainder of the electronic device essentially intact.

In embodiments that provide an interchangeable and/or repositionable polarizer, the front polarizer is a separate item from the liquid crystal display module. Because interchangeable and repositionable polarizers are intended to function as the front polarizer (also referred to as "analyzer") of liquid crystal displays of the electronic devices, it is preferred that the liquid crystal display module not be pre-supplied with its own front polarizer. As such, the present invention contemplates the de-coupling of display modules and front polarizers so that the front polarizers can be marketed, distributed, and sold through a unique channel of commerce that in turn gives rise to a level of display appearance customization and personalization not before achieved. For example, differently colored, oriented, or patterned front polarizers can be marketed directly to end users as components to customize the display appearance. In this way, multiple different "looks" can be readily obtained for the same electronic device and display by interchanging front polarizers. Releasably attachable and repositionable polarizers and their corresponding electronic devices can be adapted so that front polarizer interchanging and repositioning can be performed at any point in the chain of commerce of the electronic device, including (and often preferably) at the end user level. The ability to interchange covers or face plates in combination with or independently from the interchangeable front polarizers can add further appearance customization dimensions.

Releasably attachable articles containing a front polarizer according to the present invention can be exchanged with other articles having other front polarizers to give different viewing experiences including different character and/or background colors, different color combinations and patterns, image reversal, contrast enhancement or adjustments, and the like. In some embodiments, interchanging front polarizers can be used to customize the appearance of the display, for example to coordinate the display appearance to the color and/or other appearance characteristics of an interchangeable cover or face plate for the electronic device. Interchangeable front polarizers can also be used to customize the appearance of the electronic device without changing or adding a cover, face plate, or other such item to the electronic device.

Repositionable front polarizers are those that can be tilted and/or rotated relative to and in many cases independent from the display module, whether or not the front polarizers are also releasably attachable to the electronic device. Repositionable front polarizers can be used to change display appearances "on the fly," or to enhance or adjust display performance characteristics such as contrast or brightness as desired by the user, for example to accommodate changed lighting conditions.

Removable and interchangeable display modules can give a user the ability to alter not just the display appearance but also the display size and the display functionality. For example, a mobile phone display and key pad may be removable (separately or as a unit) and replaceable with a larger display that has a touch panel user interface. Display module replaceablity can also be used to upgrade electronic devices with new technology displays or higher end displays without purchasing a whole new device.

Examples of electronic devices contemplated in the present invention include mobile phones, portable devices such as a personal digital assistants (PDAs) and other handheld organizers, computers, calendars, and electronic books, radios or compact disc players that have liquid crystal displays, digital versatile disc players, automotive liquid crystal displays, household appliances that included liquid crystal displays, wrist watches and clocks that have liquid crystal displays, handheld electronic games, and the like.

Electronic devices contemplated for use in the present invention can be equipped with liquid crystal displays for displaying images or information to a viewer. The liquid crystal displays can be any suitable liquid crystal display capable of displaying monochromatic images, multiple color images, or full color images at high, medium, or low resolution, or any combination of these (e.g., low resolution color icon bar combined with a medium resolution monochromatic alphanumeric and graphics display area). Generally, liquid crystal displays are capable of functioning in a reflective mode, a transmissive mode, or both. Reflective LCDs, as well as transflective LCDs operating in a reflective mode, can be illuminated using light incident from the front, or viewer side, of the liquid crystal cell. Such light can be ambient light and/or light generated from an internal light source and directed into the display from the front using a front light guide. Transmissive LCDs, as well as transflective LCDs operating in a transmissive mode, can be illuminated using light from an internal light source, typically located behind the liquid crystal cell.

According to the present invention, releasably attachable front polarizers can be provided for electronic devices that are designed or adapted for their use. To make a releasably attachable article that includes a front polarizer, polarizers can be laminated, molded, bonded, or otherwise adhered to a window, lens, or other visible light transmissive substrate that can be removably attached directly to the electronic device or liquid crystal display, or through the use of one or more collars, covers, face plates, and the like. As such, the polarizer can be permanently attached to a window portion of a cover or face plate, can be part of an exchangeable window or lens that removably attaches to the electronic device and/or to a cover or face plate that itself can be removably attached, can be an add-on item that can be attached to an existing lens or window portion positioned in front on the liquid crystal display, or the like.

Repositionable front polarizers of the present invention can likewise be provided as window elements, lens elements, or the like, or as part of a face plate, cover, or other such item or portion thereof.

Removable display modules are preferably provided as fully functional displays that need only be electronically connected in a suitable manner to a power source and any necessary electronics not already included in the module. In exemplary embodiments, electronic devices can be designed or adapted in a modular fashion so that display modules can be removed and replaced without an unduly high risk of disrupting the integrity of the device.

It will be understood that in any of the embodiments of the present invention, releasably attachable or repositionable front polarizers, releasably attachable or repositionable articles that include front polarizers, and removable display modules can optionally include other desirable coatings, optical films or components, and/or electronic components in any suitable combination. For example, waveplates, lenses, retarders, compensators, light control films, privacy films, brightness enhancement films, filters, antiglare coatings, antismudge coatings, and touch panels are some components that may be included. As such, any addition to improve hardness, glare reduction, color, or optical performance, or electronic functionality is to be considered as a part of this invention.

FIG. 1 shows a generalized electronic device 100 that includes a housing 110, a liquid crystal display 120, and electronics (not shown) for operating the display 120 and for functioning the device. Device 100 can also include a power source (not shown) such as a rechargeable battery, and/or a means for plugging the device into a remote power source (not shown). Electronic device 100 also includes, or is adaptable to include, releasably attachable article 10 that includes a front polarizer. Article 10 is attached or attachable in a position between the display 120 and a user or viewer 170. Article 10 may attach to housing 110, to display 120, or to another item that can be attached (removably or permanently) to the electronic device or display.

Display 120 includes a liquid crystal display module 130 and optional components such as a back polarizer 160, a reflector 150, and a back light 140. Other components can also be included behind or in front of the display module 130. For example, a front light source and light guide (not shown) can be supplied between module 120 and viewer 170 to provide an auxiliary front light for reflective mode displays when ambient light is insufficient for desired viewing. The relative positions of the components of display 120 are presented for illustrative purposes only, and it will be appreciated that the positions and presence of individual components can depend on many factors.

For embodiments such as shown in FIG. 1, display module 130 preferably does not include a front polarizer. Instead, article 10 includes the front polarizer through which a user views the display to discern an image. In other embodiments, one or more polarizers can be included as a front and/or as a rear polarizer on display module 130 in cases where display module 130 is removably mounted in the electronic device 100. In still other embodiments, a front polarizer is tiltably or rotatably attached to device 100.

Electronic device 100 and/or releasably attachable article 10 can be adapted for releasably attaching article 10 to device 100 in a position so that the polarizer of article 10 serves as a front polarizer for display 120. Any suitable attachment means or combinations thereof can be employed. For example, a tongue and groove system can be used for snapping or sliding article 10 into position, tabs and slots can be used as positional guides and/or as means for interference fitting article 10 into position, mechanical fasteners such as hook and loop fasteners or microstructured fasteners can be used, adhesives that allow article 10 to be attached and removed (and optionally re-attached) can be used, a collar or frame can be used that holds article 10 in position where the collar or frame is adapted for releasably attaching to the electronic device 100, pegs and holes can be used to position and/or to interference fit article 10 into location, and any interlocking male and female members can be suitably fashioned for positioning and releasably mating article 10 to device 100. Attaching means can be included as part of article 10 or as part of a cover, face plate, frame, or other item that can attach to the device while holding article 10 in place.

Figure 2A:
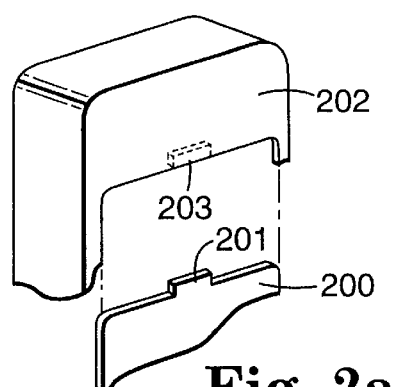
FIGS. 2(a) through (f) are schematic depictions of various attachment means usable in the present invention.

FIGS. 2(a)–(f) provide some non-limiting examples of attaching means for releasably attaching an article that includes a front polarizer to an electronic device that includes a liquid crystal display module. FIG. 2(a) shows that an article 200 can be releasably attached to a device 202 by engaging a tab 201 on article 200 with a corresponding slot 203 on device 202. The tab and slot arrangement can also be reversed. It maybe desirable for article 200 to be at least somewhat flexible or bendable so that it can be slightly flexed before engaging the slots and tabs to allow relatively easy positioning. Once in position, the tabs and slots can more fully engage to secure the article 200.

Figure 2B:
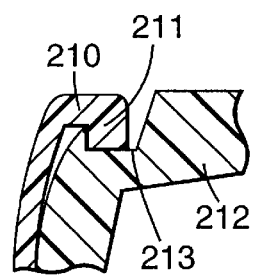

FIG. 2(b) shows a partial cross-section of an article 210 releasably attached to a device 212. Article 210 includes a flange and locking member 211 that can be fitted into a locking recess 213. Flange and locking member 211 can be provided on certain portions of article 210, or can be included over the entire periphery of article 210. Locking member 211 and locking recess 213 can be engaged by directly snapping article 210 into position on device 212, or by sliding article 210 onto device 212 (for example, sliding article 210 in or out of the page showing FIG. 2(b)).

Figure 2C:
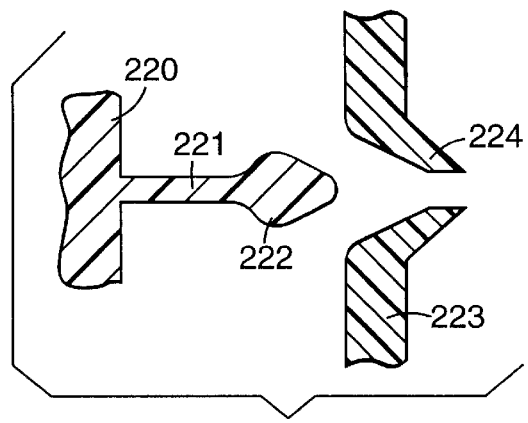

FIG. 2(c) shows a partial cross-section of a first article 220 that has a male locking tab 221 and a second article 223 that has a female locking tab 224 capable of engaging and releasably locking the male tab 221. Male and female locking tabs can be located on either or both of the electronic device and the article that includes the front polarizer.

Figure 2D:
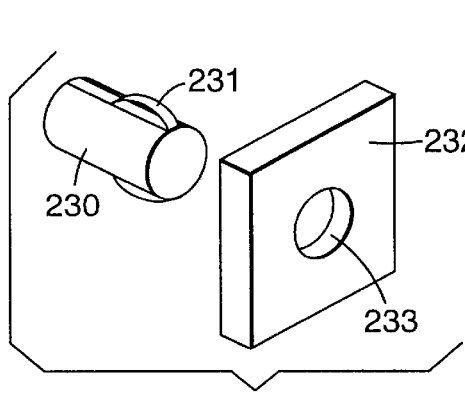

FIG. 2(d) shows a pin 230 and a corresponding hole 233 in an article 232. Pin 230 is shown equipped with optional springs 231 for frictionally engaging pin 230 with hole 233 and releasably locking pin 230 in position upon engagement. Alternatively, a friction between the pin and the hole can be relied upon for engagement without the use of a spring. Pins and holes can also be used as positioning guides to help ensure proper alignment when releasably attaching an article containing a front polarizer to an electronic device using other attaching means. Either or both of the electronic device or front polarizer containing article can include one or more pins or holes.

Figure 2E:
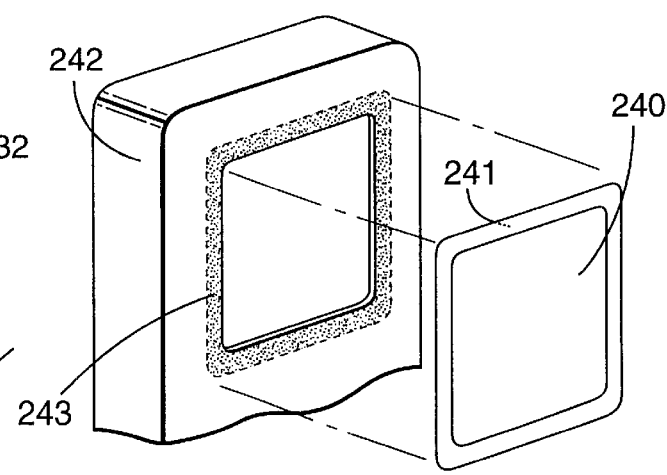

FIG. 2(e) schematically shows an article 240 that includes a front polarizer and an article 242 that may be an electronic device, a face plate or cover for an electronic device, or the like. Article 240 is shown to have an annular region 241 that corresponds to a similarly shaped annular region 243 on article 242. The annular regions 241 and 243 indicate regions where mechanical fasteners and/or mating surfaces can be located. For example, annular regions 241 and 243 can include mating hook and loop materials, mating microstructured surface fasteners, and the like. Alternatively, one or both of annular regions 241 and 243 can include an adhesive that can allow article 240 to be releasably attached to device 242. In another alternative, the adhesive permanently attaches articles 240 and 242 to form a completed face plate or cover, for example, that can be releasably attached to an electronic device.

Figure 2F:
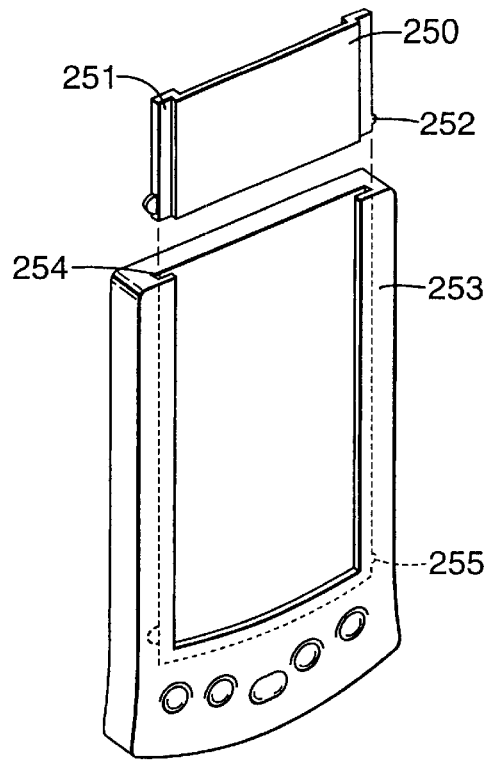

FIG. 2(f) schematically shows an article 250 that includes a front polarizer and a portable electronic device 253 that includes a liquid crystal display. Article 250 is adapted with wings (or tongues) 251 and device 253 is adapted with slots (or grooves) 254 for guiding wings 251 when sliding article 250 over the display of device 253. As shown, the wings 251 of article 250 include bumps 252 that help snap article 250 into position when bumps 252 are frictionally engaged with corresponding indentions 255 located within slots 254 of device 253.

Figure 3A:
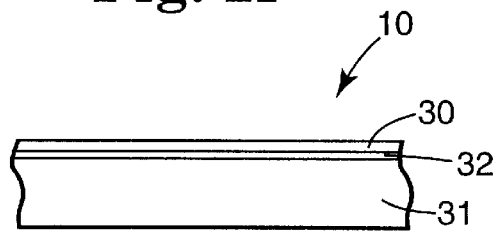
FIG. 3(a) is a schematic side view of an article that includes a polarizer.

Releasably attachable article 10 can include just the front polarizer or can include the front polarizer disposed on or attached to a suitable substrate or frame. FIG. 3(a) shows an exemplary article 10 that includes polarizer 30 disposed on one side of substrate 31. Polarizer 30 can be laminated, bonded, adhered, or otherwise attached to substrate 31, for example using an optional adhesive layer 32 that is preferably an optically clear adhesive. Substrate 31 can provide mechanical support for the polarizer 30. Also, it may be convenient to locate any attaching means that are part of article 10 on substrate 31.

Alternatively, polarizer 30 can be molded into substrate 31 to form an integral polarizer/substrate element. For example, substrate 31 can be a lens or window that is molded from a transparent plastic such as a polyacrylate or polycarbonate. Polarizer 30 can be added at any suitable point in the molding process to bond the polarizer and the substrate to form an integral element.

Substrate 31 can be any suitable substrate, and is preferably substantially transmissive to all or one or more portions of the visible spectrum so that the liquid crystal display can be viewed through article 10 by a viewer when article 10 is positioned in front of liquid crystal display of an electronic device. Substrate 31 can be clear or colored, for example to achieve desired display appearances. Substrate 31 can be birefringent or non-birefringent. Whereas conventional wisdom would argue against using birefringent materials disposed between a liquid crystal display module and its front polarizer, having substrate 31 be birefringent can lead to interesting and visually pleasing optical effects, even at the potential loss of some optical performance.

It may also be desirable for substrate 31 or adhesive 32 to perform a light diffusing function, for example to increase the range of viewing angles for the display. The inclusion of particles and/or a structured surface can add a diffusing function to the substrate or optional adhesive. If polarizer 30 is positioned between the viewer and substrate 31, and substrate 31 or adhesive 32 performs a diffusing function, the diffuser is preferably one that substantially maintains the polarization of light. Suitable substrate materials include glass, rigid plastics such as polycarbonate and polyacrylate, and flexible plastics such as polyethylene terapthalate, polyimide, and others. Substrate 31 can function as a window, or can provide optical effects. For example, substrate 31 can be a lens, for example a magnifying lens. Substrate 31 can also be adapted to provide ultraviolet radiation protection, EMI shielding, and the like.

Polarizer 30 can be any polarizer suitable as a front polarizer for a liquid crystal display. Exemplary polarizers include a linear polarizers that substantially transmit one linear polarization state and substantially absorb or reflect the orthogonal linear polarization state. Polarizer 30 can be combined with other elements such as additional polarizers (e.g., to achieve a higher extinction ratio and/or to achieve desired appearance effects), retarders, waveplates, compensators, and the like. When two or more polarizers are stacked to form a front polarizer, their respective transmission axes can be aligned, crossed (i.e., orthogonally oriented), or positioned to form any other desired angle between them.

Polarizer 30 is preferably oriented so that its transmission axis is positioned to preferentially transmit polarized light emitted by the display that represents characters or to preferentially transmit the polarized light emitted by the display that represents background. Typically, the characters and background are represented by orthogonally oriented polarization states. In exemplary applications, article 10 is designed for and adapted to be releasably attached to a particular electronic device or type of electronic device that includes a liquid crystal display module whose orientation is known so that polarizer 30 can be effectively oriented relative to the liquid crystal display module for the desired display appearance. Alternatively, substrate 31 can be designed and adapted for a particular electronic device or type of electronic device, and a polarizing film can be provided along with, but separate from, the substrate 31. In such a case, for a given device and liquid crystal display, the polarizing film can be positioned and rotated until the desired orientation is achieved. Then, the polarizing film can be adhered to substrate 31, for example using an optical adhesive, and the excess film can be trimmed.

Figure 3B:
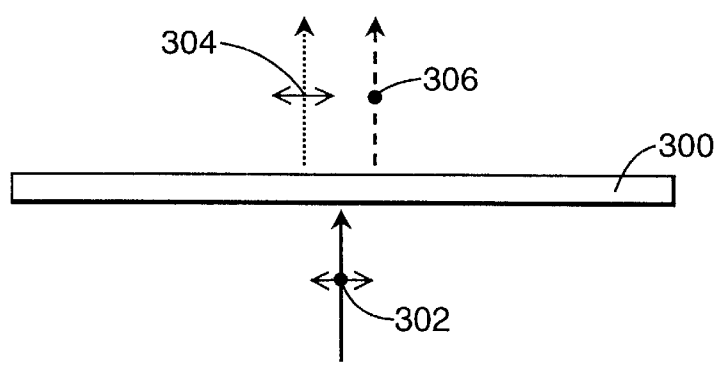
FIG. 3(b) is a schematic representation of the effect of a polarizer on transmitted light.

FIG. 3(*b*) shows a polarizer 300 useful in the present invention, for example as a releasably attachable front or rear polarizer, as a repositionable front or rear polarizer, or as a front or rear polarizer attached to a removable display module. Generally, polarizer 300 transmits incident light having different spectral characteristics depending on the plane of polarization. For example, when randomly polarized light 302 is incident on polarizer 300, light of a first linear polarization state 304 ("←→" indicates polarization in the plane of the page) can be transmitted having a first spectral distribution, and light of a second, orthogonal linear polarization state 306 ("•" indicates polarization perpendicular to the plane of the page) can be transmitted having a second spectral distribution different from the first. Light that is not in the transmission spectrum for a given polarization state is substantially absorbed by polarizer 300 when polarizer 300 is an absorbing polarizer and is substantially reflected when polarizer 300 is a reflective polarizer. While FIG. 3(*b*) shows the case of a linear polarizer, circular polarizers can also be used, typically in conjunction with quarter wave plates for conversion between circular and linear polarization states.

Polarizer 300 can be made to transmit substantially all visible light having one polarization state and to transmit substantially none of the visible light of the other polarization state (white/black, or neutral density). Polarizer 300 can also be made transmit a color of light having one polarization state and another color of light having the orthogonal polarization state (color/color, or dual color). Polarizer 300 can also be made to transmit a color of light having one polarization state and to transmit substantially none of the visible light of the other polarization state (color/black). Polarizer 300 can also be made to transmit substantially all visible light having one polarization state and to transmit a color of light having the other polarization state (color/clear or color/white).

While not specifically indicated in FIG. 3(*b*), polarizer 300 can be a single polarizer, can include more than one polarizer (e.g., to increase contrast, change color, provide dual color capability, and the like), can include a polarizer and a coloring layer (e.g., to enhance coloration, to provide dual color capability, and the like), or can include a polarizer and one or more retarders (e.g., to alter polarization states, for contrast enhancement, for coloration, and the like). Colored polarizers and polarizing elements are disclosed in International Publications WO 01/31371, WO 96/37806, and WO 96/16015, and in U.S. Pat. Nos. 6,147,937; 5,751,483; 5,751,389; and 4,770,500. Polarizer 300 can also be patterned so that different regions transmit different colors and/or different polarization states. Patterned regions can be random or ordered. Examples of patterned polarizing elements are disclosed in International Publications WO 01/31371, WO 98/52077, and WO 96/16015, and in U.S. Pat. Nos. 5,861,931; 5,235,449; and 4,466,704.

Table 1 shows examples of some possible spectral combinations for each of the two orthogonal linear polarization states that can be transmitted by polarizer 300. Other desired color combinations are also contemplated by the present invention.

TABLE 1

("X" denotes possible color combination)

| | | Color Transmitted in First Polarization State | | | | | | | |
|---|---|---|---|---|---|---|---|---|---|
| | | White | Red | Green | Blue | Magenta | Cyan | Yellow | Purple | Black |
| Color Transmitted in Second Polarization State | White | | x | x | x | x | x | x | x | x |
| | Red | X | | x | x | x | x | x | x | x |
| | Green | X | x | | x | x | x | x | x | x |
| | Blue | X | x | x | | x | x | x | x | x |
| | Magenta | X | x | x | x | | x | x | x | x |
| | Cyan | X | x | x | x | x | | x | x | x |
| | Yellow | X | x | x | x | x | x | | x | x |
| | Purple | X | x | x | x | x | x | x | | x |
| | Black | X | x | x | x | x | x | x | x | |

When the polarizer is used as a front polarizer for a liquid crystal display and suitably oriented, these color combinations are revealed in the appearance of the displayed characters and the appearance of the displayed background. For example, a white/black polarizer can be used to display black characters on a white background or, rotated 90°, white characters on a black background. Image reversal (i.e., flip-flopping character color and background color) can take place for any possible color combination by rotating the polarizer 90° from an initial orientation. Intermediate orientations, that is between 0° and 900° from the original orientation, are also possible (e.g., to achieve desired coloration effects, even if contrast becomes somewhat muted).

As used herein, the term "color" denotes a spectral distribution of less than the whole visible spectrum as is expected when one or more dyes are used to absorb light in one or more portions of the visible spectrum and to thereby transmit a color of light. Color can be understood in the context of the various dye-related arts. In this respect, transmitting a color of light means transmitting one or more wavelengths or wavelength bands of light in the visible spectrum, or in the case of black, substantially no wavelengths in the visible spectrum. The special case of black also includes dark shadings of gray where small amounts (e.g., no more than about 10% or 15%) of any or all visible wavelengths might be transmitted but still does not result in a dominant coloration.

Any polarizer suitable for use as a polarizer for liquid crystal displays can be used. Suitable polarizers include dichroic polarizers (such as linear absorbing polarizers, for example iodine-stained and stretched polyvinyl alcohol (PVA) films), reflective polarizers (such as cholesteric circular reflective polarizers, multilayer birefringent reflective polarizers, and the like), combinations of absorbing and reflective polarizers, and others. Exemplary absorbing polarizers include oriented and stained PVA (or other films), polarizing sheets such as K-type or KE-type polarizers, for example as disclosed in U.S. Pat. No. 5,666,223 and by John J. Cael and Giorgio Trapani, "Molecular and Spectroscopic Properties of a Polarizer Based on a Block Copolymer of Vinylalcohol and Acetylene," *Macromedi Symposia—Polymers in Display Applications*, pp. 45–57 (2000), guest-host polarizers, as well as others.

Even polarizers that would not otherwise be thought of as suitable candidates for liquid crystal display front polarizers can be used as front polarizers in the present invention, especially when used as removable front polarizers. For example, reflective polarizers are not typically thought of as good candidates for front polarizers for LCDs because they can reflect ambient light, thereby potentially increasing glare and reducing contrast. However, reflective polarizers can also give a metallic looking display appearance that may be pleasing to some users. In situations where aesthetics are more important to the user than optimal optical performance, reflective polarizers, or other non-conventional front polarizers, may be used. Interchangeability of front polarizers can then allow for switching front polarizers for improved optical performance, and/or to achieve other appearance characteristics. Thus, in a general sense, the present invention allows aesthetic considerations as well as optical performance considerations to be taken into account when choosing a front polarizer.

Exemplary guest-host polarizers for use in the present invention include those disclosed in International Publications WO 00/22463 and WO 01/31371. Guest-host polarizers can be made that exhibit a wide range of spectral characteristics for either or both of the two orthogonal polarization states. In general, guest-host polarizers include a host matrix and at least one guest dye disposed in and oriented by the host matrix. In exemplary embodiments, guest-host polarizers can include a molecular matrix that holds one or more types of dye molecules, at least one of the types being pleochroic dye molecules arranged in one or more predetermined orientations, so as to polarize incident light depending on color. Dyes of the same orientation can be mixed to produce different colors, including black.

Guest-host polarizers can include molecular matrices that orient different dyes in different directions depending on the chemical structure of the particular dye being oriented. Combinations of different dyes can be incorporated such that different dyes are oriented differently in relation to the chosen molecular matrix. In this way, combinations of two or more like-orienting or differently-orienting dyes can be used to provide a guest-host polarizer that is color/color (transmits a color of light one polarization state and another color of light having a different polarization state), color/black (transmits one color of one polarization state and absorbs substantially all visible light of the other polarization state), or white/black (transmits substantially all visible light of one polarization state and absorbs substantially all other visible light). Combining differently orienting dyes in the same host matrix can give rise to unique color and dual color polarizers in a single thin layer. Separate layers can also be combined in aligned or crossed orientations to achieve different color effects.

Alternatively, rather than using differently orienting pleochroic dyes, polarizers can be made using one or more dyes that orient in the same direction along with one or more non-orienting dyes, all disposed in a molecular matrix. In such an embodiment, the color of light of one polarization is determined by the wavelengths of light absorbed by the oriented dye or dyes and by the wavelengths of light absorbed by the non-orienting dye or dyes, whereas the color of light of the orthogonal polarization is determined by the wavelengths of light absorbed by the non-orienting dye or dyes. For example, a yellow/green polarizer can be made using a blue orienting dye and a yellow non-orienting dye so that both dyes are oriented to give green light for one polarization state and only the yellow dye is oriented to give yellow light for the orthogonal polarization state. A similar effect can be realized by combining a polarizer with a non-polarizing color film or tinted film.

Using a combination of orienting and non-orienting dyes to create a polarizer can provide more flexibility in selecting dyes. For example, once one or more suitable orienting dyes have been chosen for an application, one or more non-orienting dyes can be freely chosen and added to the formation to produce a variety of color combinations. Different color combinations can be achieved by changing the non-orienting dyes without changing the orienting dyes chosen for the application. In addition, non-orienting dyes might be more commercially available, especially when higher purity dyes are desired.

Guest-host polarizers suitable for use in the present invention can be formed by coating an aqueous solution of one or more guest dyes, such as pleochroic dyes, and a lyotropic liquid crystal host material onto a solid substrate and drying the coating. The substrate onto which the polarizer solution is coated may form a permanent substrate for the polarizer or may be temporary, allowing the polarizer to be removed for use as a stand-alone item or for disposing on another substrate that is suitable for the end application. Exemplary substrates include glass and rigid polymeric substrates as well as flexible polymer films, multilayer films, optical stacks, structured films or substrates, and the like. Exemplary substrates can also include other components useful in displays such as other polarizers, waveplates, light control films, touch panels, lenses, and the like. Exemplary substrates can also include partially- or fully-assembled liquid crystal display panels.

In an exemplary embodiment, lyotropic nematic liquid crystalline materials can be used as the molecular or host matrix of guest-host polarizers. Liquid crystalline matrix materials containing at least one triazine group can be especially useful. Matrix materials in this class can act as hosts to a variety of guest dyes while imparting the same or different orientations to different dyes. This can enable single polarizing layers to be produced using suitable choices of dyes that allow transmission of different colors in different polarization planes.

When coating a liquid solution of the host compound with one or more suitable guest dyes, shear can be applied to the liquid layer to impart an ordered structure to the liquid crystalline host material. For sufficient applied shear, the oriented liquid crystalline structure can orient the pleochroic guest dye or dyes to produce an oriented coated layer that can be dried to produce a single layer that has dichroic polarizing properties. Because the levels of shear stress created in the liquid layer during coating are low compared to the shear stresses which might cause mechanical deformation of rigid substrates, the process of forming the dichroic layer has a reduced tendency to create stresses that might distort the optical properties of the substrate.

Molecular matrix materials suitable for the present invention include lyotropic nematic liquid crystal host compounds of the type disclosed in U.S. Pat. No. 5,948,487. International Publications WO 01/31371 and WO 00/22463 also disclose suitable host compounds as well as suitable guest dyes.

As discussed above, the electronic devices suitable for use with a releasably attached front polarizer according to the present invention can be any electronic device that uses a liquid crystal display module to alter a polarization of light in order to display information. FIG. 4 schematically shows examples of electronic devices that include a liquid crystal display 400 and that can be adapted to releasably attaching an article 10 that includes a front polarizer. The devices shown in FIG. 4 are meant to be illustrative and not to limit the types of devices that can be employed. Likewise, the means of attaching articles that include a front polarizer as shown in FIG. 4 are for illustrative purposes and are not meant to be limiting.

Figure 4A:
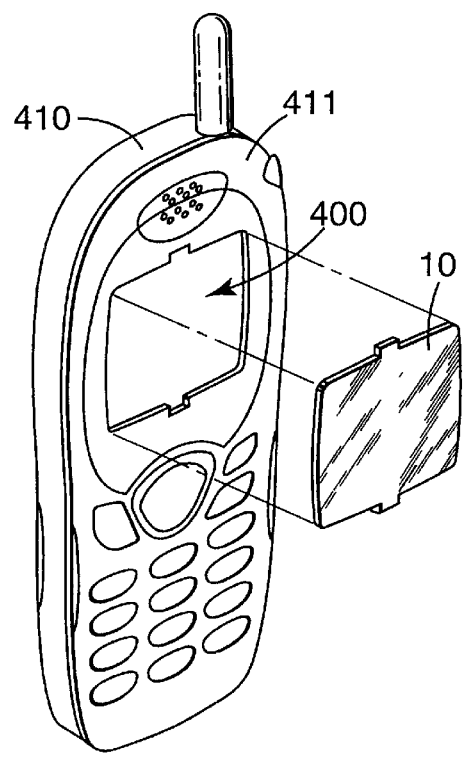
FIGS. 4(a) through (d) are schematic depictions of various electronic devices that include liquid crystal display modules and that can be adapted for attachment of articles that include front polarizers.

FIG. 4(a) depicts a mobile phone 410. As shown, mobile phone 410 includes a face plate 411 that can be permanently attached as part of the housing of the phone 410 or removably attached to phone 410 as an add-on cover or as a changeable cover such as disclosed in U.S. Pat. No. 5,768, 370. Article 10 can attach to the cover 411 or to another part of device 410, or article 10 can be held in place between removably attached cover 411 and device 410.

Figure 4B:
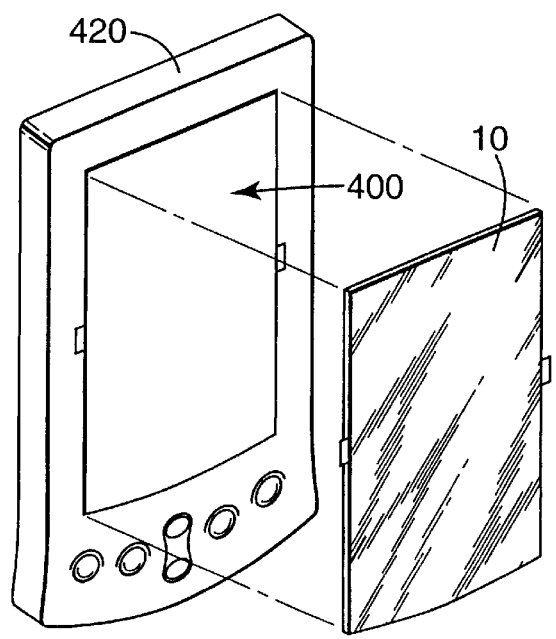

FIG. 4(b) depicts a PDA 420 that includes liquid crystal display 400 and that is adapted for releasably receiving article 10 that includes a front polarizer for the display 400. Many PDAs include a touch panel user interface. As such, in many instances, article 10 maybe positioned between the touch panel of the PDA and the user of the PDA, and so the user will be applying the force to activate the touch panel through article 10. Thus, it may be desirable for article 10 to be relatively thin and compliant so that response and resolution of the touch panel can be substantially maintained.

Figure 4C:
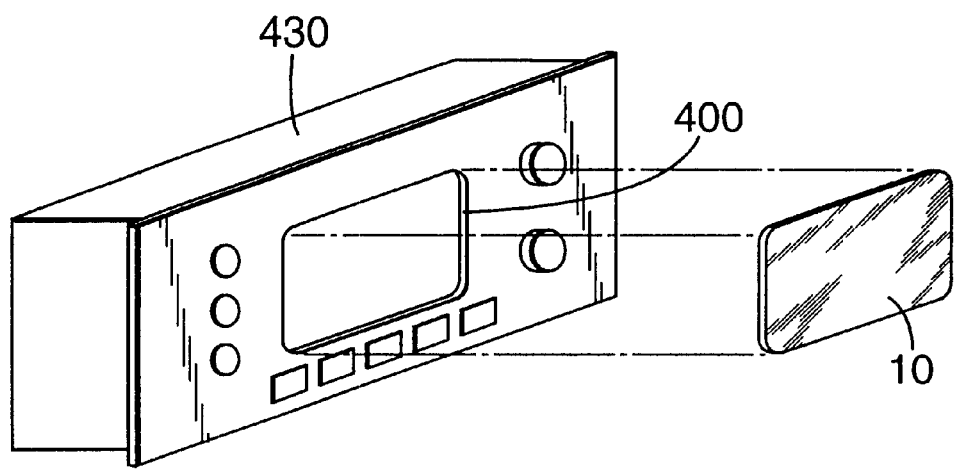

FIG. 4(c) depicts a car radio 430 that has a liquid crystal display 400 and that is adapted for releasably receiving article 10 that includes a front polarizer for the display 400. In some instances, a car radio display may include a time indicator, a station indicator, and one or more icons or graphic indicators. Article 110 can include a patterned polarizer, or more than one different polarizers covering different areas, for example to give a different appearance to the icons versus to the time and station indicators. Similar effects can be achieved for mobile phone displays, PDA displays, or other displays that might combine two or more different areas that display different kinds of information.

Figure 4D:
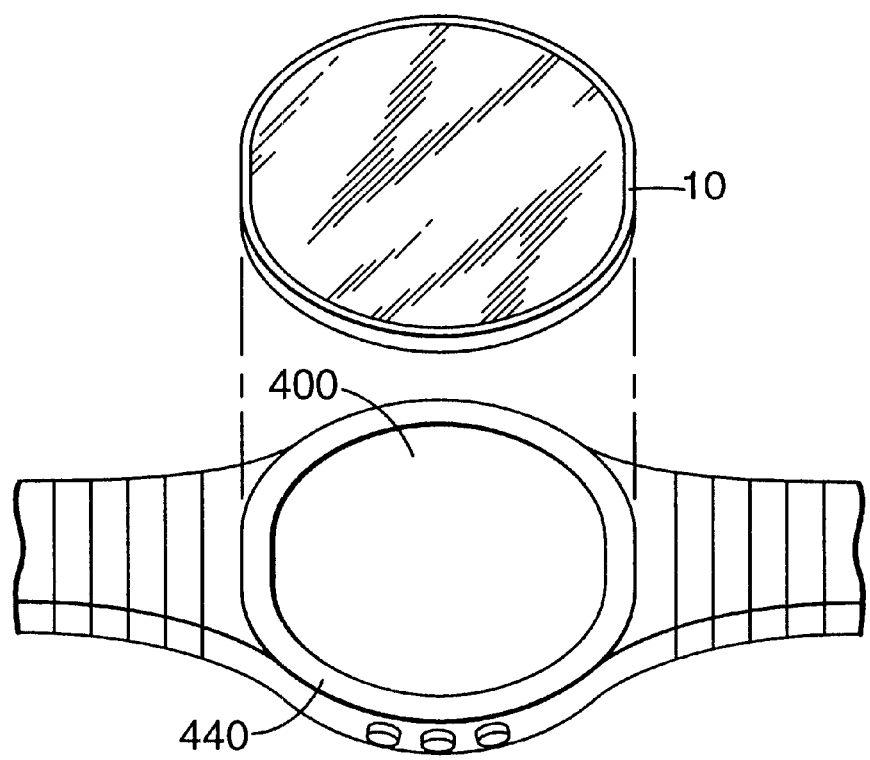

FIG. 4(d) shows a wrist watch 440 that has a liquid crystal display 400 and that is adapted for releasable receiving article 10 that includes a front polarizer for the display 400. The often circular shape of the face of a wrist watch such as shown in FIG. 4(d) can provide an opportunity to releasably attach article 10 at any desired rotation orientation and/or to rotate article 10 to any position after it is attached to the watch.

Rotatably positionable front polarizers can allow a user to readily re-orient the polarizer to alter the display appearance, contrast, coloration, and the like, to adjust to changed lighting conditions, or even to achieve a degree of privacy (polarizer oriented at 45° with respect to the two polarizations of light transmitted by the liquid crystal display cell). While a wrist watch provides an illustrative instance, rotatably positionable front polarizers may be adapted for and applied to any electronic device having a liquid crystal display, regardless of whether the polarizer is releasably or permanently attached to the device. In addition, electronic devices may be provided with rotatable rear polarizers. Rotating a rotatable rear polarizer can be used to change the polarization state of light that is transmitted to the liquid crystal cell for modulation. In practice, rotating the rear polarizer can give rise to the same visual effects as rotating the front polarizer.

As discussed, releasably attachable articles that include front polarizers can be polarizing films; transmissive windows, substrates or lenses that include a polarizer; covers, face plates or other such items that include a polarizer or that include a transmissive substrate, window, or lens that includes a polarizer; and so forth. Although FIGS. 4(a)–(d) illustrate removable window articles that include polarizers, any manner of releasably attaching front polarizers to electronic devices that include liquid crystal displays, either directly or through the use of one or more other removable items, is contemplated.

Figure 5A:
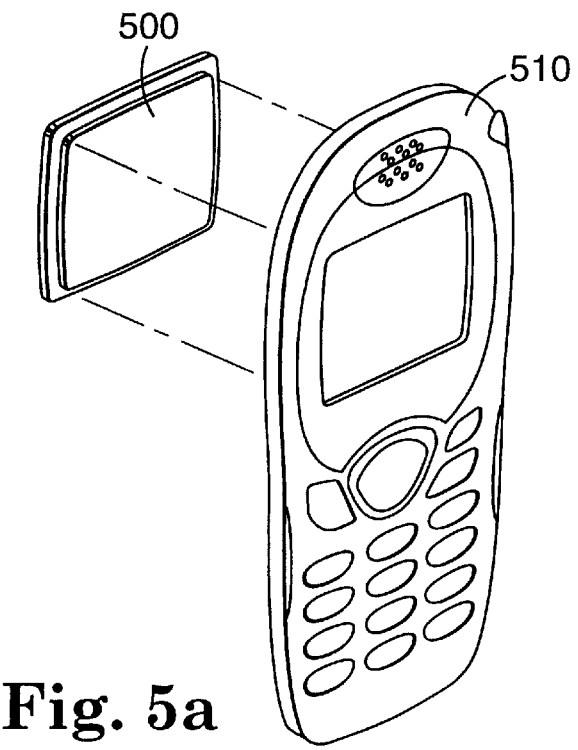
FIGS. 5(a) and (b) are schematic representations of attachable face plates and window elements that includes front polarizers.
Figure 5B:
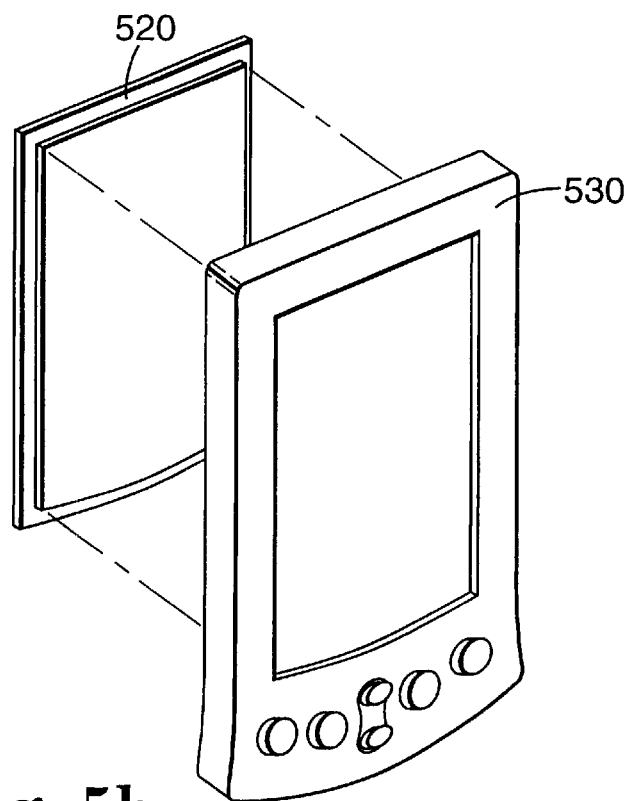

FIGS. 5(a) and (b) illustrate one way that polarizer-containing articles can be attached through the use of another removably attachable item. FIG. 5(a) shows a window 500 that includes a front polarizer and that is adapted to fit in the window aperture of a removable face plate 510 for a mobile phone (not shown). As shown, window 500 fits between the face plate 510 and the phone, and the face plate 510 removably attaches to the phone by any suitable manner. Suitable means for removably attaching face plates to mobile phones are disclosed in U.S. Pat. No. 5,768,370. FIG. 5(b) illustrates a similar concept where the window 520 containing a front polarizer and removable cover 530 are adapted for releasably attaching to a handheld computer device (not shown).

As discussed, the present invention contemplates repositionable front polarizers for liquid crystal displays of electronic devices in embodiments where the repositionable front polarizers may or may not be releasably attachable. For example, a polarizer can be suitably mounted on a hinged transmissive plate so it can be tilted relative to the plane of the display. This can provide several benefits. For example, tilting the front polarizer can expose the display module to at least a portion of ambient light that does not first go through the front polarizer. This can allow more light to enter the display, which in turn can lead to a brighter display appearance under reflective mode display conditions. The user can still view the display by looking through the tilted-up front polarizer. Indeed, viewing through a tilted front polarizer can enhance display contrast by limiting the attenuation losses that are otherwise introduced by the top polarizer, and often by directing the user's line of sight away from the peak glare angle due to surface reflections off the display. Aside from performance benefits, tiltable front polarizers may be desirable to a user based on a "novelty factor" that capitalizes on a user's surprise reaction to seeing no image displayed when viewing the display module directly (i.e., not through the front polarizer) and then seeing the image "magically" reappear upon shifting gaze back through the front polarizer. Such a novelty factor can also add to the consumer desirability of releasably attachable front polarizers that can be detached, played around with, and reattached by users, independent from any stylization concerns or desires.

Figure 6:
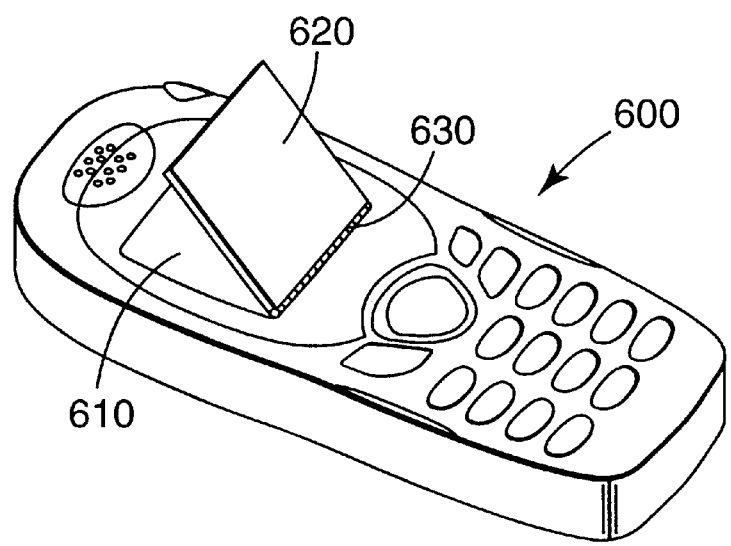
FIG. 6 is a schematic representation of an electronic device having a liquid crystal display module and a repositionable front polarizer.

Tiltable front polarizers can be provided so that they are removably attached to an electronic device or permanently attached to an electronic device. To illustrate, FIG. 6 shows a mobile phone 600 that includes an LCD module 610 and a tiltably connected front polarizer 620 that is attached by a hinge 630. Handheld devices such as phone 600, PDAs, and others may be particularly suited for tiltable polarizer applications since users have a natural tendency to hold such devices with the display tilted at least slightly back. This places the display module in position for receiving extra ambient light when the polarizer is tilted up and for directing the user's gaze away from the peak glare angle. Having a tiltable polarizer mounted as shown in FIG. 6 can encourage the tendency for users to tilt the device away, yielding brighter display appearances with higher contrast and reduced glare as discussed.

Tiltable front polarizers are one type of repositionable front polarizer contemplated by the present invention. Another type includes front polarizers that are rotatable with respect to the display module. An example is disclosed above in the context of a front polarizer for a wrist watch that has an LCD module. Rotatable front polarizers can be implemented with any device contemplated in the present invention, and can be continuously rotatable, rotatable into two or more discrete orientations, and can be rotatable while attached or rotatable only upon detachment and reattachment in a different orientation. Rotatable front polarizers can be used for quick image reversal, for example to improve display contrast by flipping from dark characters on a light background to light characters on a dark background, especially as lighting conditions change. In some transflective displays, the reflective mode image and transmissive mode image are mutually inverted. A rotatable front polarizer can allow a user to maintain a desired display appearance whether in reflective or transmissive mode by suitably rotating the polarizer when switching between display modes. As another example, patterned polarizers (e.g., polarizers that transmit different colors and/or polarizations of light from different regions of the polarizer) can be rotated to alter the overall display appearance, for instance by relocating a particular region of the polarizer over a different area of the display to change the appearance of that display area.

In addition to repositionable and releasably attachable front polarizers, it can be beneficial to adapt reflective mode LCDs for viewing through a remotely located analyzing polarizer, such as polarizing eye glasses. For example, mobile phones and other handheld and portable electronic devices can be equipped with LCD modules that do not have a front polarizer. The displays of such devices are not easily viewable unless viewed through a front polarizer. As described above, front polarizers can be attached to the device in front of the display. The present invention also contemplates that the front polarizer can be remotely located.

Remotely locating analyzing polarizers can provide several benefits. As discussed above in the context of tiltable front polarizers, remotely located front polarizers can give rise to brighter and higher contrast viewing of reflective mode LCDs because light illuminating the display is not attenuated by a front polarizer located between the display module and the light source. At the same time, display viewability does not depend on the distance between the front polarizer and the display module. Thus, the front polarizer can be located anywhere between the viewer and the display, including immediately in front of the viewer's eyes such as on a pair of glasses with polarizing lenses or windows. Viewing a display that does not include a front polarizer through polarizing glasses can give the viewer an element of privacy since the display is not readily viewable to onlookers that are not equipped with polarizers. An added degree of privacy can be provided by having a multiple color or colored monochrome display that can be readily viewed through certain colored polarizers but not easily viewed through others. As a variation on that theme, an electronic device such as a handheld electronic game can be designed for multiple players where the display emits differently colored and/or differently polarized images so that each player can be equipped with differently colored and/or differently oriented polarizing glasses for a different viewing experience. For example, some images viewable to one player can be hidden to another, and vice versa.

Figure 7:
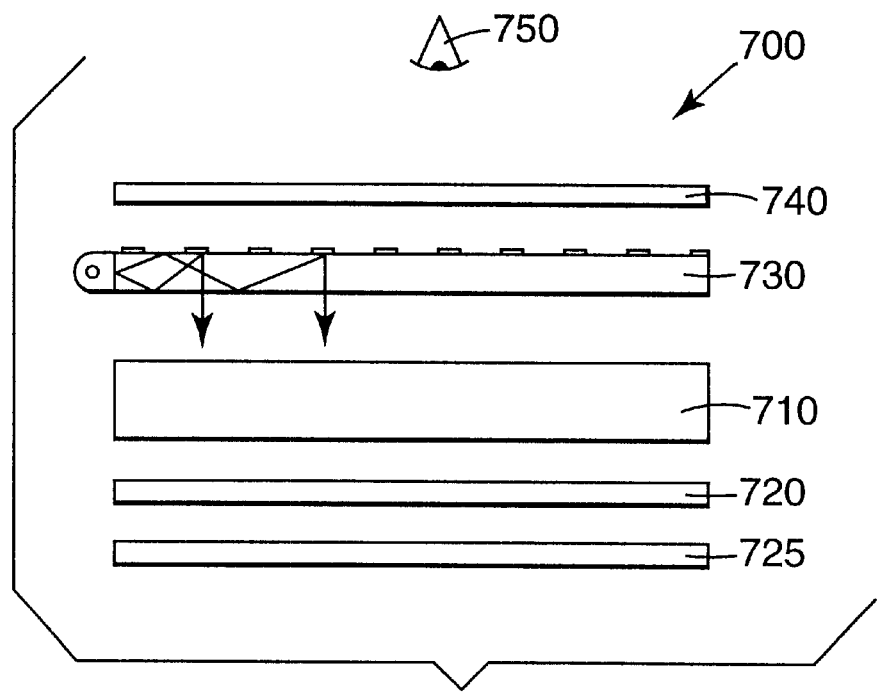
FIG. 7 is a schematic side view of a front lit reflective liquid crystal display.

De-coupling front polarizers from LCDs can also give rise to greater flexibility in illuminating reflective LCDs from the front. FIG. 7 shows a reflective liquid crystal display 700 that includes a liquid crystal cell 710 for selectively modulating the polarization of light, a rear polarizer 720, a reflector 725, a front light guide 730, and a front polarizer 740. Polarizer 720 and reflector 725 can be combined into one element such as a reflective polarizer, and absorbing polarizer bonded to a reflector, a combination reflective polarizer and absorbing polarizer, and the like. Other optical elements can be also be present in display 700.

Front light guide 730 is designed as an internal light source (as opposed to an ambient light source) that generates light and directs it down through the liquid crystal cell 710 for polarization, reflection, and retransmission through the liquid crystal cell and the front light guide so that the light can be analyzed by front polarizer 740 to display a viewable image to a viewer 750. De-coupling the front polarizer from the display module allows the front light guide to be placed between the liquid crystal cell and the front polarizer. Therefore, more light emitted by the front light guide toward the liquid crystal cell is available for display illumination because it does not have to first pass through the front polarizer. Furthermore, the construction shown in FIG. 7 is less susceptible to reduced contrast due to glare from reflections off the front light guide, or due to light undesirably emitted toward the viewer directly from the front light guide, because the front polarizer, being positioned between the viewer and the front light guide, can block some of this contrast reducing light.

As discussed previously, the present invention also contemplates removable and exchangeable display modules. Display modules can be interchanged to alter the display appearance, to change the display size, to alter the functionality of the display or the electronic device, to upgrade the electronic device with a higher end or new technology display, or the like. Electronic devices and removable display modules can be designed or adapted so that the modules can be interchanged at any level in the chain of commerce from the original equipment manufacturer, to the assembler, to the end user of the display or device. Preferably, the device is designed or adapted so that a user of the device can interchange display modules without significant risk of damaging the device or the display.

Figure 8A:
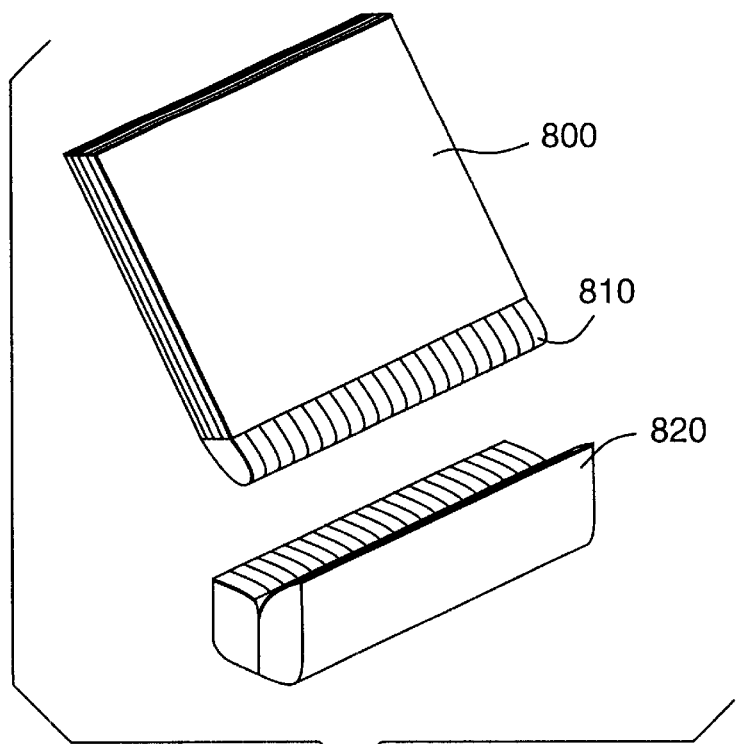
FIG. 8(a) is a schematic representation of a removable display module.

FIG. 8(a) schematically shows a display module 800 that is fully functional for displaying images once suitably electronically connected to a power source and the requisite electronics. For simple attachment and removal, module 800 can be supplied with a plurality of pins or connectors 810 that can be fit into a connector slot 820 provided in the electronic device (not shown). Connector slot 820 may be tiltably mounted in the electronic device for tilting out to easily remove and attach display modules and then tilting back into place for replacement of any covers, windows, face plates and the like that were removed for exchanging the display module. Display modules can be interchanged for style and/or for functionality.

Figure 8B:
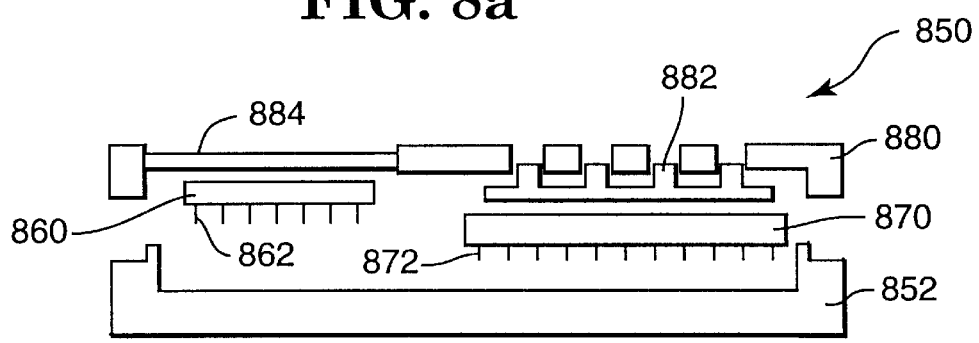
FIGS. 8(b) and (c) are schematic representations of an electronic device and removable display modules and user interfaces connectable to the electronic device.
Figure 8C:
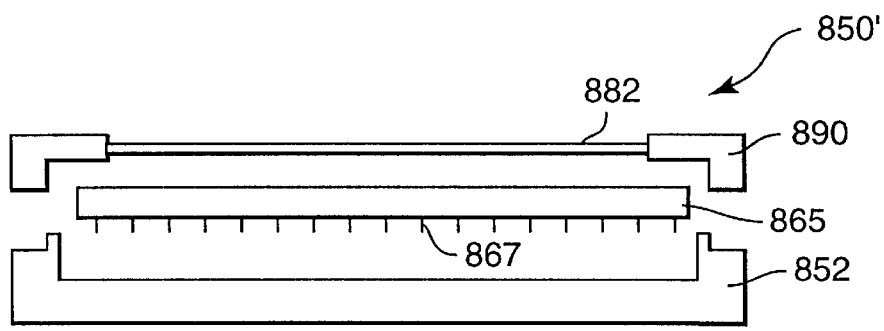

FIGS. 8(b) and (c) depict the exchanging of display modules to change user interface functionality and to provide a larger display area. FIG. 8(b) shows a schematic cross-section of an electronic device 850 that includes housing and electronics 852, a display module 860 equipped with electrical connectors 862 for removably connecting the display to the device, a keypad user interface 870 equipped with electrical connectors 872 for removably connecting the keypad to the device, and a cover 880 that includes a keypad cover 882 and a window 884. Display module 860 and keypad 870 can be separately removable or can be parts of a single unit that are removable as one piece. As designed, a user could remove the cover 880 to reveal the display module 860 and keypad 870, which in turn can be removed. FIG. 8(c) shows a schematic cross-section of an electronic device 850', which is the electronic device 850 with an exchanged display and user interface. In FIG. 8(c), display module 865 is plugged into device 850' using connectors 867. Display module 865 has a larger viewing area. Display module 865 may also be equipped with a touch panel user interface to replace the former keypad user interface. A new cover 890 can also be supplied that has a larger window area 892.

FIGS. 8(a) through (c) serve to illustrate the inventive concept of exchangeable display modules and are not meant to be limited to exchanges shown. For example, removable display modules can be used to replace a monochromatic LCD module with a full color LCD module, to replace an LCD module with another display type such as an organic electroluminescent display, to replace smaller display modules with larger display modules, to replace low resolution display modules with higher resolution display modules, to replace display modules that no longer function with working display modules, and the like.

Referring back to the inventive concept of removable front polarizers, it can be noted that, by decoupling the front polarizer from the liquid crystal display module in electronic devices, the present invention allows a new dimension of flexibility in customizing and re-customizing the display appearance of an electronic device by selecting and interchanging front polarizers. For example, knowing the make and model of their electronic device, consumers could purchase one or more different front polarizers that can be interchanged to give the display unique appearances such as black on white, white on black, color on black, color on white, black on color, white on color, color 1 on color 2, mixed colors on uniform or mixed color backgrounds, and so forth. Additionally, before, during, or after the point of sale of an electronic device, a consumer may select one or more desired display appearances from a menu generated from a list of available styles for the particular electronic device and/or the liquid crystal display provided in the device. The chosen display appearance(s) can then be correlated to the appropriate front polarizer(s), which can then be provided to the consumer as attachable articles along with the purchase of the electronic device or as a separate purchase.

Figure 9:
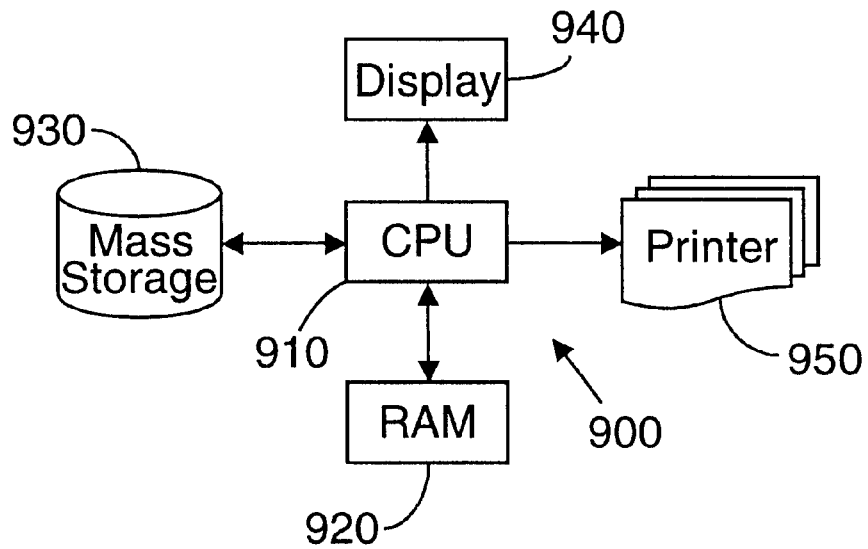
FIG. 9 is a schematic representation of a computer system.

One manner of allowing the selection of available display appearances, and therefore front polarizers, is through a computer system. Referring to FIG. 9, the computer system 900 includes a central processing unit (CPU) 910, random access memory (RAM) 920, mass storage device 930 (such as a hard drive, CD-ROM drive, diskette drive or the like), a display 940 (such as a cathode ray tube, LED, LCD or plasma display) and a printer 950 (such as a dot matrix printer, a laser printer, or an ink jet printer), associated such that the CPU can read and write to the RAM 920 and the mass storage device 930, can control the images on the display 940 and the output of the printer 950.

Figure 10:
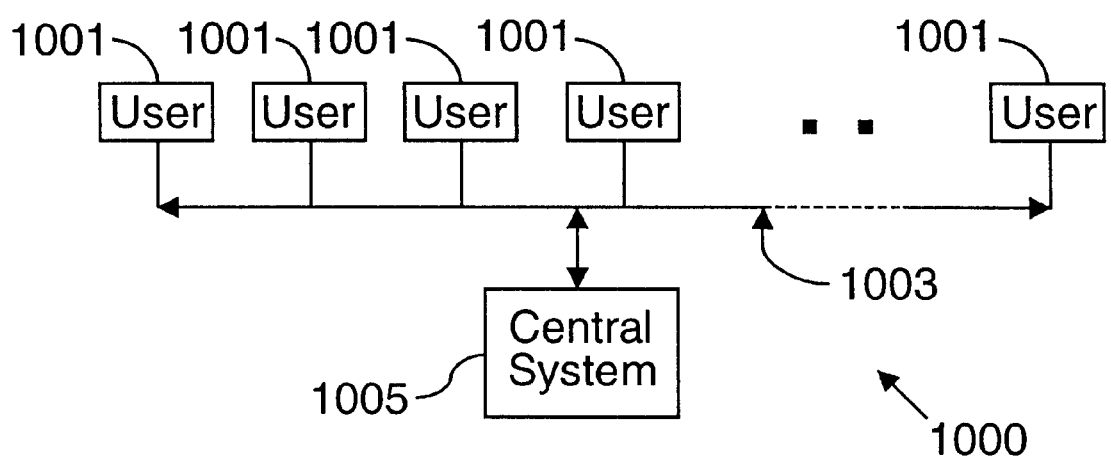
FIG. 10 is a schematic representation of a network connected to a central system.

Computer system 900 can be a home computer, in-store kiosk, computer system operated by a service person that collects data from the consumer via phone or mail-in order form, or the like. While computer system 900 can be a stand alone system, in exemplary embodiments, computer system 900 can be connected to a computer network. Referring to FIG. 10, the network 1000 can include a plurality of user systems 1001 connection via the network 1003 to a central system 1005. The central system 1005 and each user system 1001 may be generally of the type described as computer system 900. The number of users 1001 connecting to the central system may be fixed or may vary from time to time. The method of connection may be through direct or indirect, e.g., by modem, over a dedicated cable or line, over an intervening system (such as the internet), through a wireless connection or by any other appropriate system.

Figure 11:
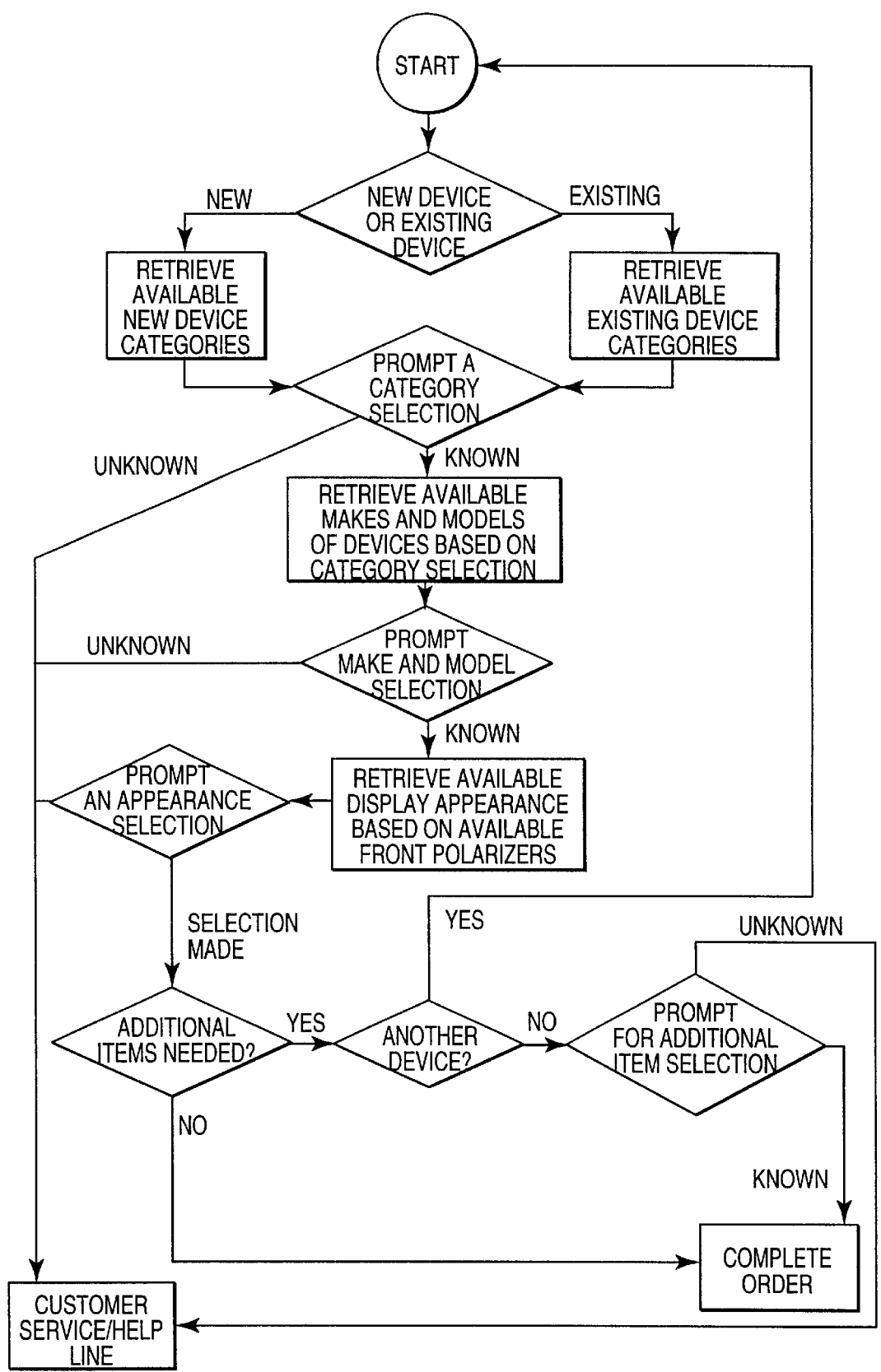
FIG. 11 is a flow chart depicting steps in a method of the present invention.

FIG. 11 is a flow chart that depicts one example of how a user or customer might interface with a computer system 900, whether or not through a network 1000, to select and order for purchase one or more front polarizers for customizing or stylizing the liquid crystal display module of an electronic device. An initial step may be to determine whether the electronic device to be stylized or customized with a front polarizer is a new device to be purchased along with an order of one or more front polarizers (and other optional components such as stylizing face plates), or whether the electronic device is already owned and is to be fitted with one or more additional front polarizers. This step may be important because the availability of front polarizers for a particular device might depend on whether the device is a newly introduced device. At any decision step, an unsure or indecisive customer can have the option of being directed to a customer service representative or help line for answers to questions and/or for completion of the ordering process.

After selecting whether a new or existing device is to be stylized, the system can retrieve the available categories of electronic devices for which front polarizers can be purchased. Using this list of available categories, the user can be prompted to select a category that matches the user preference. Examples of category delineations might be mobile phones, PDAs, other handheld or portable devices, household appliances, automotive displays, and other devices. Selection of a category can be used to retrieve a list of available makes and models of electronic devices from that category. The user can then choose the make and model that fits the device in question. From a selection of makes and models, the system can retrieve all the possible and/or available "looks" for the display of the device in question. For example, a display screen can show a picture of the chosen device and allow the user to toggle the appearance of the device's display to help the user determine a preference. Optionally, the appearance of the face plate or cover of the device can be varied by the user to help determine an overall device stylization and/or to help select new covers or face plates.

The user can then choose any one or more "looks" for the display. These preferences can be saved and correlated with the particular front polarizer (or other items) that would achieve the selected appearance. Upon completion of a set of choices, the user can instruct the system that an order is ready to be placed. Before placing the order, the system can optionally prompt whether other items are also to be purchased, for example whether to purchase the electronic device being stylized, another electronic device (in which case the order can be saved and added to the results of another run through the flow chart), new covers or face plates, and the like. When choices have been made, the user can go on to complete the order, for example by providing payment information, delivery or pick-up preferences, etc. The system may be able to inform the user whether the selected items are in stock or need to be specially ordered or custom manufactured. The order information can then be routed appropriately for fulfillment of the order.

The described system can help a consumer select a custom order of one or more releasably attachable articles that include front polarizers for liquid crystal displays of electronic device. Alternatively, it may also be useful to sell pre-packaged releasably attachable articles that include front polarizers for liquid crystal displays of electronic devices. Such articles can be sold as single items or in sets of two or more articles, for example that provide complementary appearance permutations or that conform to a particular theme. One illustrative embodiment can be a "Minnesota Sports Fan" set of four front polarizers, each of which can be used to alter the appearance of the display to conform to the uniform colors of one of the four major league sports franchises based in Minnesota. Matching removable face plates or covers can also be provided in the same package or be available for separate purchase. Other thematic examples can include a set of "mood" polarizers that a user can change out depending on his or her daily personal disposition. Front polarizers might also be marketed to a demographic that has a known or demonstrable preference for certain appearance characteristics and/or styles. For example, a set of front polarizers that have colors or other appearance characteristics that are pleasing to many BMW automobile owners can be marketed for the owners' mobile phones or PDAs. Corporate logos and/or product trademarks can be added to matching covers or face plates, under appropriate licensing arrangements, to meet the desires of the fashion conscious or to provide unique ways for corporations to market their brands. This can add a premium level of stylizing that allows personalization of devices and displays in a manner that is somewhat analogous to vanity plates, but for cell phones, palmtop computers, and the like.

Figure 12:
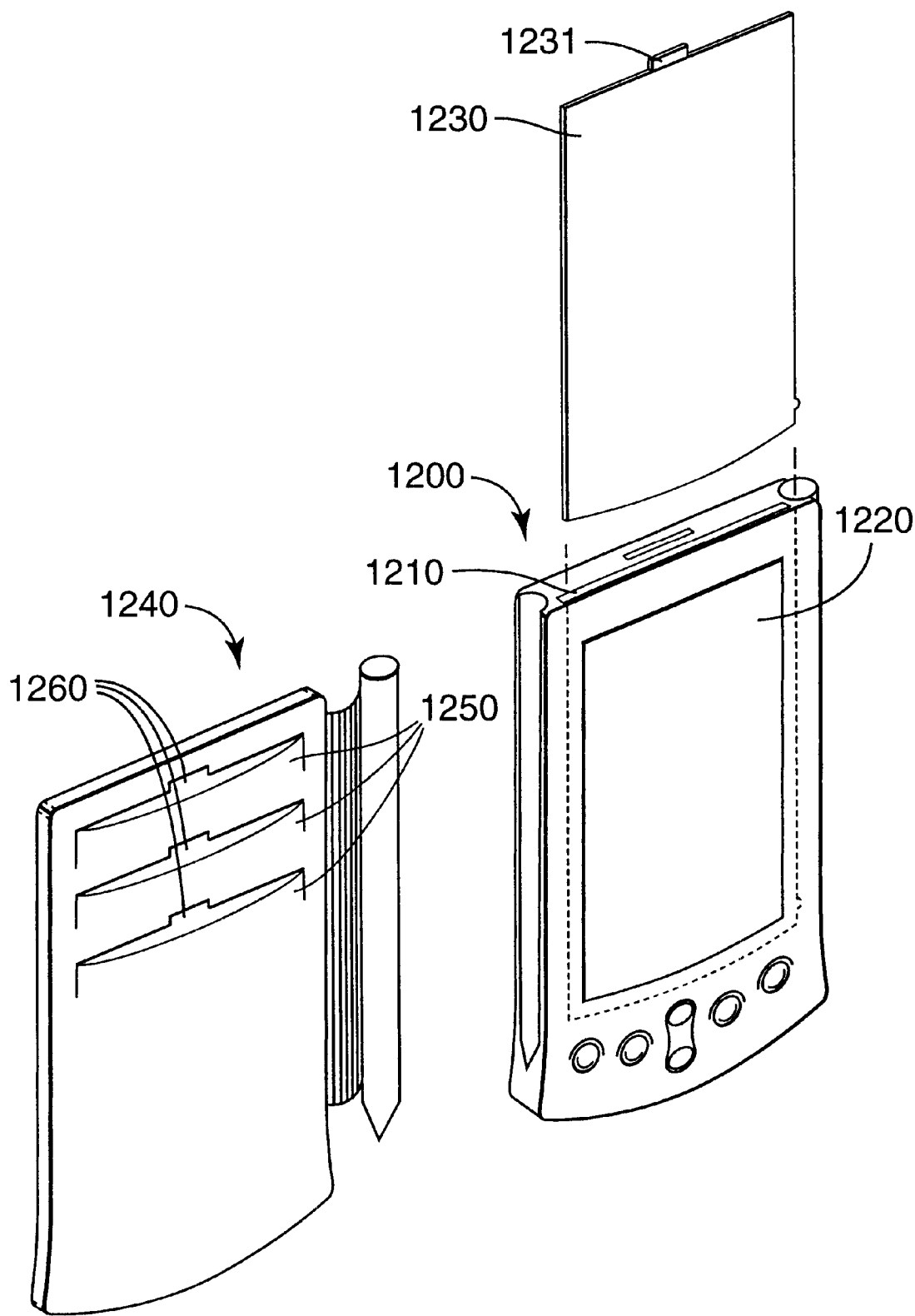
FIG. 12 is a schematic representation of an assembly that includes an electronic device, a removable front polarizer, and pockets for carrying additional front polarizers proximal to the device.

The releasably attachable front polarizer articles might also be sold as singles or in sets along with cases or containers for the electronic device that also include slots or pouches to carry the front polarizers along with the device. For example, a mobile phone carrying case or a front cover flap for a PDA can be provided that includes one or more pockets to slip various different front polarizers into so that they are readily accessible. As an illustrative embodiment, FIG. 12 shows a handheld computer 1200 that includes a liquid crystal display module 1220 and a slot 1210 for inserting a front polarizer 1230 in front of the display module 1220. Front polarizer 1230 can be provided with a tab 1231 for grabbing and removing the polarizer 1230, for example to replace it with another polarizer. FIG. 12 also shows a cover flap 1240 that is designed as a cover flap for handheld computer 1200. Cover flap 1240 include a series of overlying pockets 1250 that are capable of portably storing front polarizers 1260 that can be interchanged as the front polarizer of handheld computer 1200. As such, the user is able to carry one or more replacement front polarizers along with the device for convenient polarizer interchanging. The concept shown in FIG. 12 can be extended to any suitable device that has a liquid crystal display module that can be stylized with interchangeable front polarizers, and is particularly suited to any portable or handheld device.

FIG. 12 can also be used to illustrate interchangeable rear polarizers. In such a case, slot 1210 is positioned so the polarizer 1230 can be slid into position behind the display module 1220. For display modules that are capable of operating in a transmissive mode, polarizer 1230 can be positioned between the display module 1220 and a backlight (not shown). For display modules that are capable of operating in a reflective mode, polarizer 1230 can be positioned between the display module 1220 and a reflector (not shown), or polarizer 1230 can be a reflective polarizing element (e.g., a reflective polarizer or an absorbing polarizer disposed on a reflective element).

Each of the patents, patent documents, and publications cited above is hereby incorporated into this document as if reproduced in full.

EXAMPLES

Examples 1 and 2

A Nokia model 3310 cell phone display was modified by stripping the top linear absorbing polarizer from the liquid crystal display module of the phone, which polarizer was provided there by the original equipment manufacturer. The cell phone display without the front polarizer provided a platform for evaluating exchangeable front polarizer concepts.

Example 1

In a first example, an absorbing front polarizer similar to the one provided with the cell phone was cut to match the clear area of the lens element in the exchangeable face plate of the cell phone. The front polarizer was then laminated to the underside of the lens surface using a clear pressure sensitive adhesive. The optical axis of the front polarizer was oriented orthogonal to that of the polarizer originally supplied with the cell phone. By replacing the removable face plate having the new front polarizer, the display appeared as light characters on a black background as opposed to the original black character on light background display appearance.

Example 2

In a second example, a dual color guest host polarizer was used as the front polarizer. The dual color polarizer transmitted a "lighter" cyan color of light of one linear polarization state and a "darker" blue color of the orthogonal linear polarization state. The dual color polarizer was made as described in the following Example 3. The dual color polarizer was cut and laminated to the inside surface of the clear lens of the exchangeable face plate of the cell phone using a clear pressure sensitive adhesive. The dual color polarizer was oriented to provide a display appearance of dark blue text on a cyan colored background when the exchangeable face plate was replaced.

Example 3

The blue/cyan dual color guest host polarizer used in Example 2 was made in the following manner.

A host solution was prepared by dissolving 12 grams of the lyotropic host material designated below as "Compound B" in 82 grams of an aqueous solution containing 5% by weight of $NH_4OH$ in deionized water. A surfactant commercially available under the trade designation AGP 325 from the Cognis Corporation, Ambler, Pa., was then added to the host solution in an amount of 0.1% by weight to enhance the coatability of the solution.

Compound B

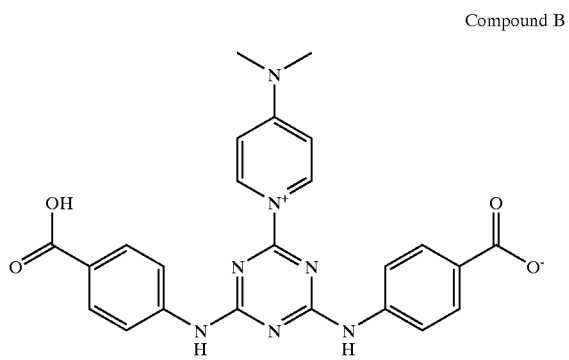

The following dyes in the following amounts were then added to 94 grams of a the host solution to make a guest-host solution: 3 grams of acid blue 9 available from Crompton & Knowles Colors Inc., Charlotte, N.C., under the trade designation Intrajet Blue AJA, and 1.7 grams of direct blue 53 available from Sigma-Aldrich, St. Louis, Mo., under the trade designation Evans Blue. The guest-host solution was then shear coated onto polyethylene terephthalate (PET) substrate to a wet-thickness of about 8 microns. The PET substrate was a pre-primed PET film commercially available from Teijin Ltd., Osaka, Japan. The coating was then dried at 50° C. for 20 seconds, resulting in a dual color polarizer that transmitted a light cyan color in one linear polarization state and a darker blue color in the orthogonal linear polarization state.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

What is claimed is:

1. An electronic device comprising:
    a liquid crystal display module for selectively altering a polarization of light for displaying information; and
    a front polarizer mounted to the electronic device so that the front polarizer can be tilted toward or away from the display module while maintaining viewability of the display module through the front polarizer.

2. The electronic device of claim 1, wherein the display module is capable of being operated in a reflective mode.

3. An electronic device comprising a liquid crystal display capable of displaying information in a reflective mode, the liquid crystal display comprising:
    a liquid crystal display module for selectively altering a polarization of light, the display module having a front side oriented toward a viewer position; and
    a front polarizer associated with the liquid crystal display and disposed between the display module and the viewer position in a manner such that light from the front side of the display module illuminates the display module without first passing through the front polarizer,
    wherein the front polarizer is mounted to the electric device so that the front polarizer can be tilted toward or away from the display module.

* * * * *

UNITED STATES PATENT AND TRADEMARK OFFICE
CERTIFICATE OF CORRECTION

PATENT NO. : 6,642,977 B2
DATED : November 4, 2003
INVENTOR(S) : Kotchick, Keith M.

It is certified that error appears in the above-identified patent and that said Letters Patent is hereby corrected as shown below:

Column 7,
Line 20, delete "maybe" and insert in place thereof -- may be --

Column 10,
Line 65, delete "900°" and insert in place thereof -- 90° --

Column 13,
Line 48, delete "maybe" and insert in place thereof -- may be --
Line 59, delete "110" and insert in place thereof -- 10 --

Signed and Sealed this

Twenty-fifth Day of May, 2004

JON W. DUDAS
*Acting Director of the United States Patent and Trademark Office*